(12) United States Patent
Faucher et al.

(10) Patent No.: US 12,365,754 B2
(45) Date of Patent: Jul. 22, 2025

(54) POLYMER AND METHOD FOR THE PREPARATION THEREOF

(71) Applicant: SNF Group, Andrezieux Boutheon (FR)

(72) Inventors: Gatien Faucher, Andrezieux Boutheon (FR); Damien Fougerouse, Andrezieux Boutheon (FR)

(73) Assignee: SNF GROUP, Andrezieux Boutheon (FR)

( * ) Notice: Subject to any disclaimer, the term of this patent is extended or adjusted under 35 U.S.C. 154(b) by 0 days.

(21) Appl. No.: 18/868,630

(22) PCT Filed: May 24, 2023

(86) PCT No.: PCT/EP2023/063987
§ 371 (c)(1),
(2) Date: Nov. 22, 2024

(87) PCT Pub. No.: WO2023/227693
PCT Pub. Date: Nov. 30, 2023

(65) Prior Publication Data
US 2025/0171577 A1 May 29, 2025

(30) Foreign Application Priority Data
May 25, 2022 (FR) ..................... 2205072

(51) Int. Cl.
*C08F 297/02* (2006.01)
*D21H 17/43* (2006.01)
*D21H 21/10* (2006.01)
*D21H 21/18* (2006.01)
*D21H 23/04* (2006.01)

(52) U.S. Cl.
CPC ......... *C08F 297/026* (2013.01); *D21H 17/43* (2013.01); *D21H 21/10* (2013.01); *D21H 21/18* (2013.01); *D21H 23/04* (2013.01)

(58) Field of Classification Search
CPC .... C08F 220/06; C08F 220/54; C08F 220/56; C08F 228/02
See application file for complete search history.

(56) References Cited

U.S. PATENT DOCUMENTS 10,759,746 B2    9/2020   Favero et al.
2008/0196851 A1  8/2008   Hund et al.

FOREIGN PATENT DOCUMENTS

| CN | 109400821 A | * | 3/2019 | ........... C04B 24/165 |
| EP | 919578 A1 | * | 6/1999 | ........... C08F 273/00 |
| FR | 2880901 B1 | | 7/2006 | |
| JP | 2008031622 A | * | 2/2008 | |
| JP | 2012251252 A | | 12/2012 | |

OTHER PUBLICATIONS

Tang et al., J. Sppl. Polym. Sci. 2016, 43824 (1-9).*
International Search Report and Written Opinion of the International Searching Authority for PCT/EP2023/063987, mailed on Aug. 8, 2023.

* cited by examiner

*Primary Examiner* — Vu A Nguyen
(74) *Attorney, Agent, or Firm* — HESLIN ROTHENBERG FARLEY & MESITI P.C.

(57) ABSTRACT

The present invention relates to a novel anionic water-soluble polymer, to the method for the preparation thereof and to the use thereof, notably in the paper field.

20 Claims, No Drawings

POLYMER AND METHOD FOR THE PREPARATION THEREOF

CROSS REFERENCE TO RELATED APPLICATIONS

This application is a national stage filing under section 371 of International Application No. PCT/EP2023/063987 filed on May 24, 2023, and published on Nov. 30, 2023, as WO 2023/227693, which claims priority to French Application No. 2205072, filed on May 25, 2022. The entire contents of WO 2023/227693 are hereby incorporated herein by reference.

TECHNICAL FIELD OF THE INVENTION

The present invention relates to a novel anionic water-soluble polymer, to the method for the preparation thereof and to the use thereof, notably for applications in the paper field.

PRIOR ART

The paper industry is always seeking to improve its methods for producing paper, cardboard or the like, notably in terms of cost reduction, yield, productivity or also quality of the final product.

This is notably the case for the packaging industry which is seeking paper, cardboard or the like with better dry strength performances and this notably in order to address current ecological issues and in order to replace plastic packaging. This search for improvement should not occur to the detriment of productivity.

The dry strength of paper is by definition the strength of the sheet, the cardboard or the like in the dry state. Traditionally, the mechanical strength values provide a measurement of the dry strength. One can speak notably of bursting strength, tensile strength, compressive strength, delamination strength.

It is well known to use water-soluble cationic polymers in order to improve the strength properties of paper. Due to their nature, these polymers can be attached directly on the anionic cellulose and give it a cationic charge so that, in association with anionic polymers, attachment of the latter on the cellulosic fibers occurs, thus improving the dry strength of the sheet.

JP 2012 251252 discloses a papermaking process involving an amphoteric polymer.

The most commonly used cationic polymers are compounds of the type of cationic starch, polyamide epichlorohydrin (PAE), polyamide amine epichlorohydrin (PAAE), optionally glyoxalated cationic polyacrylamide, polyvinylamine, polyethyleneimine (PEI), polyamines epichlorohydrin resins (PA) or polymers obtained by the Hofmann degradation.

This combination of cationic and anionic polymers is well known for improving the dry strength. It has already been proposed, notably in document FR 2880901 B1, to associate cationic polymers with an anionic polymer, the aim of this association being to offer an effective system for the dry strength of the paper sheet.

The problem of such an association between two polymers in solution is the loss of the drainage properties of the paper. By reducing the drainage properties, the speed of the paper-making machine is reduced, which causes a significant drop in productivity.

The problem is primarily due to the anionic polymers which are synthesized by liquid process and which have a low molecular weight. In liquid process, the increase of the molecular weight results in an increase of the viscosity. Above a certain molecular weight, it is no longer possible to obtain a liquid.

To overcome this problem, manufacturers had to turn to other polymerization techniques, such as gel polymerization, in order to obtain higher molecular weights. The polymers resulting from these polymerization techniques are in solid forms.

There are numerous disadvantages associated with the use of polymers in solid forms, such as, for example:
- The manufacturer is obliged to have an on-site powder dilution system;
- The increase of the size of the installations and thus of their footprint;
- Increased energy consumption and maintenance;
- The management of the powder stocks;
- The management of preliminary dissolution of the powders;
- The more frequent and more complex maintenance.

The main problem remains the dissolution of a high molecular weight polymer powder. In fact, the dissolution of such a polymer is not trivial and requires technical know-how in order to avoid the risk of a poor dissolution which would lead to the formation of aggregates on the paper sheet leading to a weakness of the latter, or even worse, to fouling of the machinery possibly resulting in complete stopping and maintenance of the entire production unit. In addition, this type of polymer in powder form and thus of high molecular weight leads to excessive flocculation and has a detrimental effect on the forming of the sheet, which has a negative impact on the mechanical properties of the paper.

Manufacturers have looked for a long time for a solution making it possible to obtain a paper sheet which has good dry strength performances, while maintaining the satisfactory drainage properties and simplifying their installation due to the use of polymer in liquid form.

The Applicant surprisingly discovered that the synthesis of a polymer according to the method of the invention made it possible to meet the needs of the manufacturers without disadvantage for the latter.

The use of the polymers derived from the invention is part of a general principle of improvement of the performances of products and more particularly of the dry strength and drainage properties. The better performances of the polymers according to the invention make it possible to reduce the quantity of product necessary for the application, which thus implies a reduction of the discharges of greenhouse gases such as $CO_2$, which are associated with the production and the use of synthetic polymers.

DISCLOSURE OF THE INVENTION

The present invention relates to an anionic water-soluble polymer comprising:
- at least one anionic monomer A;
- at least one nonionic monomer B;
- at least one structuring system comprising:
  (i) at least one compound I, different from the at least one monomer A and selected from: allylsulfonic acid, methallylsulfonic acid, allyldisulfonic acid, methallyldisulfonic acid, the salts thereof and the mixtures thereof;
  (ii) at least one compound II of formula II, different from the at least one monomer B:

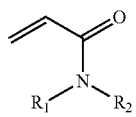

Formula II $R_1$ and $R_2$ being, independently of one another, a hydrogen atom, a methyl group, an ethyl group, an isopropyl group, or a $CH_2$—OH group;

$R_1$ and $R_2$ not both being a hydrogen atom ($R_1 \neq H$ when $R_2 = H$; $R_2 \neq H$ when $R_1 = H$).

This anionic water-soluble polymer is obtained according to the following steps:
- a) formation of a solution (S1) comprising a first fraction (F1) containing (1) at least one monomer selected from the monomers A and B and (2) at least one compound selected from the compounds I and II;
- b) polymerization 1 (PO1) of the fraction F1 in order to form a solution of a first gradient polymer (PG1);
- c) addition, to the solution comprising PG1, of a second fraction (F2) containing (1) at least one monomer selected from the monomers A and B and (2) at least one compound selected from the compounds I and II;
- d) polymerization 2 (PO2) of the fraction F2 on PG1 in order to form a solution of a second gradient polymer (PG2);
- e) addition, to the solution comprising PG2, of a third fraction (F3) containing (1) at least one monomer selected from the monomers A and B and (2) at least one compound selected from the compounds I and II;
- f) polymerization 3 (PO3) of the fraction F3 on PG2 in order to form a solution comprising an anionic water-soluble polymer and
- at least one of the fractions F1, F2 or F3 contains at least one monomer A, at least one of the fractions F1, F2 or F3 contains at least one monomer B, at least one of the fractions F1, F2 or F3 contains at least one compound I and at least one of the fractions F1, F2 or F3 contains at least one compound II.

This anionic water-soluble polymer contains no cationic monomer and zwitterionic monomer.

In the present invention, the first and second gradient polymers are prepolymers.

The present invention also relates to the method for preparing this anionic water-soluble polymer. It is a sequential polymerization method.

The present invention also relates to a method for producing paper and cardboard using this anionic water-soluble polymer.

The present invention also relates to the use of this anionic water-soluble polymer in the recovery of hydrocarbons (oil and/or gas); in well drilling or cementing; in the stimulation of hydrocarbon wells (oil and/or gas), for example, hydraulic fracking, conformance, diversion; in the treatment of water in an open, closed or semi-closed circulation; in the treatment of fermentation musts, in the treatment of sludges; in construction; in the treatment of wood; in the treatment of hydraulic compositions (concrete, cement, mortar and aggregates); in the mining industry; in the formulation of cosmetic products; in the battery field; in the formulation of detergents; in textile production; in geothermal technology; in diaper production; or in agriculture.

The invention also relates to the use of this anionic water-soluble polymer as flocculant, coagulant, binder, fixation agent, viscosity reducing agent, thickening agent, absorbing agent, friction reduction agent, drainage agent, filler retention agent, dehydration agent, conditioning agent, stabilizing agent, fixation agent, film generating agent, sizing agent, superplasticizing agent, clay inhibitor or dispersant.

DESCRIPTION OF THE INVENTION

"Polymer" designates a copolymer prepared from at least two different monomers, with at least one anionic monomer A and at least one nonionic monomer B, and from a structuring system comprising at least one compound I and at least one compound II. It can optionally comprise at least one hydrophobic monomer and/or a crosslinking agent and/or a transfer agent.

Water-soluble polymer is understood to mean a polymer which yields an aqueous solution with no insoluble particles when it is dissolved under stirring at 25° C. and at a concentration of 10 $g \cdot L^{-1}$ in deionized water.

In the entire description, the viscosities are measured using a Brookfield viscosimeter, at 25° C., with a Brookfield LV3 module, in aqueous solution.

In the present description, a person skilled in the art is considered to be capable of determining the appropriate module and speed of the Brookfield viscosimeter depending on the viscosity range to be measured. This type of measurements is in fact part of the general knowledge of a person skilled in the art.

According to the invention, "X and/or Y" is understood to mean "X," or "Y," or "X and Y."

Also part of the invention are all the possible combinations among the different disclosed embodiments, whether they are preferred embodiments or embodiments given as example. In addition, when the ranges of values are indicated, the limits are part of these ranges. The disclosure also includes all the combinations among the limits of these ranges of values. For example, the ranges of values "1-20, preferably 5-15" imply the disclosure of the ranges "1-5," "1-15," "5-20" and "15-20" and of the values 1, 5, 15 and 20.

Anionic Water-Soluble Polymer

The anionic water-soluble polymer according to the invention comprises:
- at least one anionic monomer A;
- at least one nonionic monomer B;
- at least one structuring system comprising:
  - (i) at least one compound I, different from the at least one monomer A and selected from: allylsulfonic acid, methallylsulfonic acid, allyldisulfonic acid, methallyldisulfonic acid, the salts thereof and the mixtures thereof;
  - (ii) at least one compound II of formula II, different from the at least one monomer B:

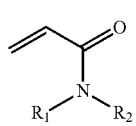

Formula II $R_1$ and $R_2$ being, independently of one another, a hydrogen atom, a methyl group, an ethyl group, an isopropyl group or a $CH_2$—OH group;

$R_1$ and $R_2$ not both being a hydrogen atom ($R_1 \neq H$ when $R_2 = H$; $R_2 \neq H$ when $R_1 = H$).

This polymer contains no cationic monomer and zwitterionic monomer.

Monomeric Composition

The anionic water-soluble polymer according to the invention is a synthetic polymer. It can comprise one or more anionic monomers (referred to as "monomer(s) A").

Advantageously, the or the other anionic monomers A can be selected in a large group. These monomers can have a vinylic function, notably an acrylic, maleic, fumaric, malonic, itaconic or allylic function. They can also contain a carboxylate, phosphonate, phosphate, sulfonate group or another anionic charge group. Preferred monomers belonging to this class are, for example, acrylic acid, methacrylic acid, itaconic acid, crotonic acid, maleic acid, fumaric acid, acrylamidoundecanoic acid, 3-acrylamido-3-methylbutanoic acid, maleic anhydride, 2-acrylamido-2-methylpropanesulfonic acid (ATBS), vinylsulfonic acid, vinylphosphonic acid, 2-sulfoethylmethacrylate, sulfopropylmethacrylate, sulfopropylacrylate, allylphosphonic acid, styrenesulfonic acid, 2-acrylamido-2-methylpropanedisulfonic acid, the salts thereof and the mixtures thereof. Preferably, these monomers are acrylic acid or itaconic acid, even more preferably acrylic acid.

Thus, in a particular embodiment of the invention, the anionic monomer(s) A can be salified.

Salified is understood to mean the substitution of a proton of at least one acid function of the type —R(O)—OH (with R=P, S or C) of the anionic monomer A is replaced by a metal cation to form a salt of the type —R(O)—OX (with X is a metal cation). In other words, the non-salified form corresponds to the acid form of the monomer, for example R—C(=O)—OH in the case of the carboxylic acid function, whereas the salified form of the monomer corresponds to the R—C(=O)—O—X+ form, X+ corresponding to an alkali cation. The salification of the acid functions of the water-soluble polymer can be partial or total.

The salified form advantageously corresponds to the salts of alkali metals (Li, Na, K . . . ), of alkaline earth metals (Ca, Mg . . . ) or of ammonium (for example, the ammonium ion or a tertiary ammonium). The preferred salts are sodium salts.

The salification can be carried out before or after the polymerization.

The anionic water-soluble polymer advantageously comprises between 1 and 99 mol % of anionic monomer(s) A, preferably between 2 and 70 mol %, more preferably between 3 and 50 mol %, and even more preferably between 5 and 35 mol %.

In a particular embodiment of the invention, when the anionic monomer A is 2-acrylamido-2-methylpropanesulfonic acid, it is the hydrated form thereof. The hydrated form of ATBS is a particular form of ATBS which can be obtained by controlled crystallization of the ATBS monomer. The document U.S. Pat. No. 10,759,746 describes this hydrated form of ATBS.

The anionic water-soluble polymer can comprise one or more nonionic monomers (referred to as "monomer(s) B").

Advantageously, the nonionic monomer(s) B can be selected notably from the group comprising the water-soluble vinylic monomers. Preferred monomers belonging to this class are, for example, acrylamide, methacrylamide, N-vinylformamide (NVF), N-vinyl acetamide, N-vinylpyrrolidone (NVP), N-vinyl imidazole, N-vinyl succinimide, acryloyl morpholine (ACMO), acryloyl chloride, glycidyl methacrylate, glyceryl methacrylate, diacetone acrylamide, hydroxyalkyl (meth)acrylate ($C_1$-$C_3$ alkyl), thioalkyl (meth)acrylate ($C_1$-$C_3$ alkyl) and the mixtures thereof. Preferably, this is acrylamide.

The anionic water-soluble polymer advantageously comprises between 1 and 99 mol % of nonionic monomers B, preferably between 30 and 98 mol %, more preferably between 50 and 97 mol %, and even more preferably between 65 and 95 mol %.

The anionic water-soluble polymer can optionally comprise one or more hydrophobic monomers (referred to as "monomer(s) C").

Advantageously, the hydrophobic monomer(s) C can be selected from the group consisting of the esters of (meth) acrylic acid having a $C_4$-$C_{30}$ alkyl, arylalkyl ($C_4$-$C_{30}$ alkyl, $C_4$-$C_{30}$ aryl) chain, propoxylated, ethoxylated, or ethoxylated and propoxylated; the derivatives of (meth)acrylamide having a $C_1$-$C_3$ alkyl, propoxylated arylalkyl ($C_4$-$C_{30}$ alkyl, $C_4$-$C_{30}$ aryl), ethoxylated, ethoxylated and propoxylated, or dialkyl ($C_4$-$C_{30}$ alkyl) chain; alkyl aryl sulfonates ($C_4$-$C_{30}$ alkyl, $C_4$-$C_{30}$ aryl), or mono- or di-substituted amides of (meth)acrylamide having a $C_4$-$C_{30}$ alkyl, arylalkyl ($C_4$-$C_{30}$ alkyl, $C_4$-$C_{30}$ aryl) chain, propoxylated, ethoxylated, or ethoxylated and propoxylated; the derivatives of (meth) acrylamide having a $C_4$-$C_{30}$ alkyl, propoxylated arylalkyl ($C_4$-$C_{30}$ alkyl, $C_4$-$C_{30}$ aryl), ethoxylated, ethoxylated and propoxylated, or $C_4$-$C_{30}$ dialkyl chain; the alkyl aryl sulfonates ($C_4$-$C_{30}$ alkyl, $C_4$-$C_{30}$ aryl) and the mixtures thereof.

The anionic water-soluble polymer advantageously comprises at least one 1 mol % of hydrophobic monomers C. It can be free of hydrophobic monomer C.

When the anionic water-soluble polymer according to the invention comprises one or more hydrophobic monomers C, they are present in a quantity such that the polymer remains water-soluble.

The quantities of the different monomers will be adjusted by a person skilled in the art so as not to exceed 100 mol % during the preparation of the water-soluble polymer. Preferably, the monomers A and B represent 100 mol % of the monomers of the anionic water-soluble polymer.

Structuring System

The structuring system of the anionic water-soluble polymer comprises:

(i) at least one compound I;

(ii) at least one compound II.

The compound I used in the context of the invention is selected from: allylsulfonic acid, methallylsulfonic acid, allyldisulfonic acid, methallyldisulfonic acid, the salts thereof and the mixtures thereof. Preferably, it is methallylsulfonic acid, for example, sodium methallyl sulfonate.

The salified form advantageously corresponds to the salts of alkali metals (Li, Na, K . . . ), of alkaline earth metals (Ca, Mg . . . ) or of ammonium (for example, the ammonium ion or a tertiary ammonium). The preferred salts are the sodium salts.

The anionic water-soluble polymer advantageously comprises between 500 and 50,000 ppm of compound I with respect to the total weight of the monomers A and B (+optionally monomer C) of the anionic water-soluble polymer, preferably between 1000 and 20,000 ppm, more preferably between 2000 and 10,000 ppm.

The compound II used in the context of the invention has the general formula:

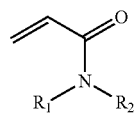

Formula II

R₁ and R₂ being, independently of one another, a hydrogen atom, a methyl group, an ethyl group, an isopropyl group or a CH₂—OH group;

R₁ and R₂ not both being a hydrogen atom (R₁≠H when R₂=H; R₂≠H when R₁=H).

The compound II used in the context of the invention is advantageously selected from: N,N-dimethacrylamide, N,N-diethylacrylamide, N,N-isopropylacrylamide, N-methylolacrylamide, and the mixtures thereof. Preferably, it is N,N-dimethylacrylamide.

The anionic water-soluble polymer according to the invention advantageously comprises between 500 and 50,000 ppm of compound II with respect to the total weight of monomers A and B (+optionally monomer C) of the anionic water-soluble polymer, preferably between 1000 and 20,000 ppm, more preferably between 2000 and 10,000 ppm.

In the anionic water-soluble polymer, the mass ratio of compound I to compound II is advantageously between 0.01 and 100, preferably between 0.1 and 10.

In a preferred embodiment according to the invention, the quantity of compound I is greater than the quantity of compound II. Thus, the mass ratio of compound I to compound II is advantageously greater than 1 and less than or equal to 100, preferably greater than 1 and less than or equal to 10.

Optional

The anionic water-soluble polymer may further comprise at least one crosslinking agent. This crosslinking agent can be selected from polyethylenically unsaturated monomers (having at least two unsaturated functions) such as, for example, vinylic functions, notably allylic, acrylic functions, or from the monomers having at least two epoxy functions. One can mention, for example, methylenebisacrylamide (MBA), triallylamine, tetraallylammonium chloride, 1,2-dihydroxyethylenebis-(N-acrylamide) and the mixtures thereof. Preferably it is methylenebisacrylamide (MBA).

The quantity of crosslinking agent in the anionic water-soluble polymer is advantageously between 5 and 5000 ppm with respect to the total weight of the monomers A and B (+optionally monomer C) of the anionic water-soluble polymer, more preferably between 50 and 3000 ppm.

In a particular embodiment according to the invention, the anionic water-soluble polymer does not comprise a crosslinking agent.

The anionic water-soluble polymer according to the invention may further comprise at least one transfer agent, for example, selected from methanol, isopropyl alcohol, sodium hypophosphite, 2-mercaptoethanol and the mixtures thereof. We can also mention the transfer agents of the xanthate, dithiocarbonate, dithiocarbamate and trithiocarbonate type and the mixtures thereof. Preferably, it is sodium hypophosphite.

The quantity of transfer agent in the anionic water-soluble polymer is advantageously between 10 and 10,000 ppm with respect to the total weight of the monomers A and B (+optionally monomer C) of the anionic water-soluble polymer, more preferably between 50 and 5000 ppm.

In a particular embodiment of the invention, the anionic water-soluble polymer does not comprise a transfer agent.

Physical Properties of the Water-Soluble Polymer

The water-soluble polymer has a weight average molecular weight advantageously between 1,000,000 and 25,000,000 daltons, preferably between 2,000,000 and 15,000,000 daltons, more preferably between 3,000,000 and 10,000,000 daltons. This is the weight average molecular weight.

The weight average molecular weight is preferably measured by gel permeation chromatography.

The anionic water-soluble polymer is obtained and used in liquid form.

The viscosity of the solution comprising the anionic water-soluble polymer is advantageously between 1000 and 50,000 cps, preferably between 5000 and 20,000 cps.

Renewable Origin

In a preferred embodiment according to the invention, the anionic water-soluble polymer is prepared from compounds (monomers and/or compounds I and II) which are at least partially of renewable and non-fossil origin.

In the context of the invention, the words "of renewable and non-fossil origin" designate the origin of a chemical compound originating from biomass or from syngas, that is to say being the result of one or more chemical transformations carried out on one or more raw materials having a natural and non-fossil origin. The words "biosourced" or "bioresourced" can also be used in order to characterize the renewable and non-fossil origin of a chemical compound. The renewable and non-fossil origin of a compound includes the renewable and non-fossil raw materials originating from the circular economy and which have been previously recycled one or more times during a process of recycling material originating from biomass such as, for example, materials originating from the depolymerization of polymer or the transformation of pyrolysis oils.

According to the invention, "at least partially of renewable and non-fossil origin" means a biosourced carbon content preferably between 5% by weight and 100% by weight with respect to the total weight of carbon of said compound, preferably at least 30%, more preferably at least 50%, even more preferably at least 70%, even more preferably at least 90%, and even more preferably it consists of 100% biosourced carbon.

In the context of the invention, the standard ASTM D6866-21, method B, is used for characterizing the biosourced nature of a chemical compound and determining the biosourced carbon content of said compound. The value is expressed in percent by weight of biosourced carbon with respect to the total weight of carbon in said compound.

Gradient

The anionic water-soluble polymer according to the invention is a gradient polymer.

The polymers having a gradient structure are polymers comprising at least two monomers in which the change in composition of the monomers is gradual, in contrast to the block polymers which have an abrupt change in composition, and in contrast to the random polymers which do not have a continuous change in composition. In the gradient polymer, because of the gradual change in composition over the length of the polymer chain, there is less intra-chain and inter-chain repulsion.

The gradient can be formed by a spontaneous or forced gradient. Spontaneous gradient polymerization is due to a difference in reactivity of the monomers. Forced gradient polymerization involves varying the composition of monomers introduced for the entire duration of polymerization.

A forced method comprises (1) the introduction of a first fraction of monomers into a reactor, (2) the addition of at least one additional fraction of monomers, which is advantageously different from the first fraction, and (3) the polymerization of the monomers introduced into the reactor. The polymerization of the monomers is initiated starting at the time of introduction of the first fraction.

The addition of the additional fraction of monomers can occur in parallel with the introduction of the first fraction of monomers into the reactor (the introduction of the fractions can thus start and end at the same time). The fractions can thus have addition profiles which differ in terms of flow rate, but with an identical total duration of addition. In fact, the flow rate of addition of a fraction can be continuous or discontinuous while being constant over the entire duration of addition or not. Alternatively, the start of the first monomer feed (first fraction) into the reactor can precede the start of the addition of a second monomer fraction. Alternatively, a first and a second fraction can be simultaneously introduced but the duration of addition of the second fraction can be greater than the duration of introduction of the first fraction into the reactor. This embodiment is also applicable to methods using at least 3 fractions of monomers.

According to the method of the invention, the anionic water-soluble polymer obtained is formed by the sequenced addition of the monomers, in other words it is preferably a forced gradient method.

The method according to the invention comprises a first fraction (F1) and at least two additional fractions (F2 and F3). At least one of the fractions F1, F2 and F3 of the method is different from the other fractions. Preferably, the fractions F1, F2 and F3 are different from one another (F1≠F2≠F3). Fraction that is different refers to a fraction having a composition of different monomers (ratio and/or nature of the monomers) and/or of compounds I and II (ratio and/or nature of the compounds I and II).

Polymerization Method

The method for sequential preparation of the anionic water-soluble polymer according to the invention comprises the following steps:
a) formation of a solution (S1) comprising at least one first fraction (F1) containing (1) at least one monomer selected from the monomers A and B and (2) at least one compound selected from the compounds I and II;
b) polymerization 1 (PO1) of the fraction F1 in order to form a solution of a first gradient polymer (PG1);
c) addition, to the solution comprising PG1, of a second fraction (F2) containing (1) at least one monomer selected from the monomers A and B and (2) at least one compound selected from the compounds I and II;
d) polymerization (PO2) of the fraction F2 on PG1 in order to form a solution of a second gradient polymer (PG2);
e) addition, to the solution comprising PG2, of a third fraction (F3) containing (1) at least one monomer selected from the monomers A and B and (2) at least one compound selected from the compounds I and II;
f) polymerization (PO3) of the fraction F3 on PG2 in order to form a solution comprising an anionic water-soluble polymer and at least one of the fractions F1, F2 or F3 contains at least one monomer A, at least one of the fractions F1, F2 or F3 contains at least one monomer B, at least one of the fractions F1, F2 or F3 contains at least one compound I and at least one of the fractions F1, F2 or F3 contains at least one compound II.

This method can comprise the addition of additional fractions.

It is possible that the improved performances of the water-soluble anionic polymer according to the invention are due to the fact that the polymerization is carried out in sequence and continuously, that is to say without interruption.

"In sequence" means that the polymerization of the monomers of the anionic water-soluble polymer occurs in multiple fractions while not being interrupted, that is to say that the addition of the fractions occurs continuously and that the polymerization does not stop. The different steps a) to f) are thus carried out successively. In other words, a first fraction of monomers can be poured (in a flow form) and polymerizes to form a first gradient polymer PG1 which continues to polymerize with the fraction F2 in order to form the gradient polymer PG2 which itself continues to polymerize with the fraction F3 in order to obtain, at the end of the polymerization, the anionic water-soluble polymer.

Preferably, at least one of the fractions F1, F2 and F3 of the method is different from the other fractions. Preferably, the fractions F1, F2 and F3 are different from one another (F1≠F2≠F3). The addition of different fractions during the polymerization method allowed the obtention of a gradient in the composition of the anionic water-soluble polymer.

In the polymerization method according to the invention, the total sum of the molar percentages of the monomers of the different fractions is equal to the total sum of the molar percentages of the monomers of the anionic water-soluble polymer.

Step a), Formation of a Solution (S1) Comprising a First Fraction (F1)

Solution (S1)

The solution S1 advantageously consists of:
a solvent;
an initiator;
a first fraction F1.

The solvent advantageously is water, or a solvent in which the monomers and the anionic water-soluble polymer are soluble. Preferably, the solvent is water.

The polymerization initiators used can be any compounds that dissociate into radicals under the polymerization conditions, for example: organic peroxides, hydroperoxides, hydrogen peroxide, persulfates, azoic compounds and redox pairs. The use of water-soluble initiators is preferred. In some cases it is advantageous to use mixtures of various polymerization initiators, for example, mixtures of redox catalysts and azoic compounds. Preferably, they are persulfates.

In a particular embodiment, the solution S1 is formed by mixing the solvent, the initiator and the fraction F1 in a polymerization vessel.

In this particular embodiment, the fraction F1 can be added all at once, in several portions or poured (in a flow form), that is to say gradually (for example, dropwise), to the solvent/initiator mixture. Preferably, the fraction F1 is added all at once to the polymerization vessel.

In a particular embodiment of the invention, the initiator and the fraction F1 are poured (in a flow form) to a polymerization vessel comprising the solvent. They can be added separately or in mixed beforehand. Preferably, they are added separately.

In a preferred embodiment of the invention, the initiator is added continuously throughout the method (steps a) to f)). In this case, the initiator is advantageously added in parallel with the different fractions, during the different polymerization steps and during the possible aging steps of the different gradient polymers (PG1 and PG2) and of the anionic water-soluble polymer.

In this preferred embodiment of the invention, the duration of the pouring of initiator is comprised between 50 minutes and 560 minutes, preferably between 130 minutes and 430 minutes.

First Fraction (F1)

Advantageously, the fraction F1 comprises between 10 and 40% by weight of monomer (A and/or B, +optionally C) with respect to the total weight of monomer (A+B+optionally C) of the anionic water-soluble polymer, preferably between 15 and 30% by weight.

The fraction F1 advantageously comprises between 0 and 50 mol % of anionic monomers A, preferably between 0 and 35 mol %, with respect to the total number of moles of monomers in the fraction F1.

The fraction F1 advantageously comprises between 50 and 100 mol % of nonionic monomers B, preferably between 65 and 100 mol %, with respect to the total number of moles of monomers in the fraction F1.

The fraction F1 advantageously comprises between 250 and 30,000 ppm of compounds I with respect to the total weight of monomers A and B (+optionally monomer C) of the anionic water-soluble polymer, preferably between 500 and 10,000 ppm, more preferably between 1000 and 7000 ppm.

The fraction F1 advantageously comprises between 250 and 30,000 ppm of compounds II with respect to the total weight of monomers A and B (+optionally monomer C) of the anionic water-soluble polymer, preferably between 500 and 10,000 ppm, more preferably between 1000 and 5000 ppm.

The different monomers and compounds constituting the fraction F1 are advantageously added in the form of solutions. These solutions can be added separately or in a mixture to the polymer vessel, all at once, in several portions or poured (in a flow form), in order to form the solution S1. Preferably, the addition occurs in a mixture and all at once.

When the fraction F1 is poured (in a flow form), the pouring advantageously lasts between 10 minutes and 80 minutes, preferably between 40 minutes and 70 minutes.

In a preferred embodiment, the fraction F1 is prepared in the reactor (polymerization vessel) before the addition of initiator.

In a preferred embodiment, the fraction F1 contains at least one monomer B, at least one compound I and at least one compound II.

Step b), Polymerization of the Fraction F1 in Order to Form a First Gradient Polymer (PG1)

Polymerization 1 (PO1)

Before the polymerization PO1, the atmosphere of the polymerization vessel can be replaced by an inert gas such as, for example, nitrogen or argon.

The polymerization PO1 is advantageously a radical polymerization. Polymerization initiators can be used, notably the initiators that dissociate into radicals under the polymerization conditions.

The polymerization PO1 is advantageously initiated at a temperature between 7° and 90° C., preferably between 75 and 85° C. The polymerization temperature is advantageously controlled using cooling means so as not to exceed 95° C.

The polymerization PO1 advantageously lasts between 10 minutes and 80 minutes, preferably between 40 minutes and 70 minutes.

The polymerization advantageously starts at the time when the first monomers, the solvent and the initiator are in contact. In other words, the duration of polymerization PO1 corresponds advantageously to the duration of the pouring of the fraction F1.

Gradient Polymer (PG1)

At the end of the polymerization PO1, a gradient polymer (or prepolymer) PG1 is obtained.

In a particular embodiment according to the invention, the gradient polymer PG1 is allowed to age for between 5 minutes and 60 minutes, preferably for between 10 minutes and 30 minutes.

"Allowed to age" means that the temperature of the medium is maintained between 8° and 90° C. after the end of the polymerization in order to allow an increase in viscosity by internal branching phenomena (ramifications) of the polymer. This definition of aging relates to all the steps of the polymerization method.

Step c), Addition of a Second Fraction (F2) to the Solution Comprising PG1

Second Fraction F2

Advantageously, the fraction F2 comprises between 30 and 80% by weight of monomer (A and/or B, +optionally C) with respect to the total weight of monomer (A+B+optionally C) of the anionic water-soluble polymer, preferably between 40 and 70%.

The fraction F2 advantageously comprises between 0 and 70 mol % of anionic monomers A, preferably between 0 and 50 mol %, with respect to the total number of moles of monomers in the fraction F2.

The fraction F2 advantageously comprises between 30 and 100 mol % of nonionic monomers B, preferably between 65 and 100 mol %, with respect to the total number of moles of monomers in the fraction F2.

The fraction F2 advantageously comprises between 250 and 30,000 ppm of compounds I with respect to the total weight of monomers A and B (+optionally monomer C) of the anionic water-soluble polymer, preferably between 500 and 10,000 ppm, more preferably between 1000 and 5000 ppm.

The fraction F2 advantageously comprises between 250 and 30,000 ppm of compounds II with respect to the total weight of monomers A and B (+optionally monomer C) of the anionic water-soluble polymer, preferably between 500 and 10,000 ppm, more preferably between 1000 and 5000 ppm.

The different monomers and compounds constituting F2 are advantageously added in the form of solutions. The solutions can be added separately or in a mixture to the polymer vessel, all at once, in several portions or in the form of a flow. Preferably, the addition occurs in a mixture and in the form of a flow.

The pouring of the fraction F2 advantageously lasts between 10 minutes and 100 minutes, preferably between 30 minutes and 90 minutes.

In a preferred embodiment, the fraction F2 contains at least one monomer A and B, at least one compound I and at least one compound II.

Step d), Polymerization of the Fraction F2 on PG1 in Order to Form a Second Gradient Polymer (PG2)

Polymerization (PO2)

The polymerization PO2 occurs as a continuation of the polymerization PO1; it occurs under the same temperature conditions (advantageously 70 to 90° C.).

The polymerization PO2 advantageously lasts between 10 minutes and 100 minutes, preferably between 30 minutes and 90 minutes.

The polymerization PO2 starts with the addition of the first monomers of the fraction F2.

Advantageously, the duration of polymerization PO2 corresponds to the duration of the pouring of the fraction F2.

Gradient Polymer (PG2)

At the end of the polymerization PO2, a gradient polymer (or prepolymer) PG2 is obtained.

In a particular embodiment according to the invention, the gradient polymer PG2 is allowed to age for between 5 and 60 min, preferably for between 10 and 30 min.

Step e), Addition of a Third Fraction (F3) to the Solution Comprising PG2

Fraction F3

Advantageously, the fraction F3 comprises between 5 and 40% by weight of monomer (A and/or B+optionally C) with respect to the total weight of monomer (A+B+optionally C) of the anionic water-soluble polymer, preferably between 10 and 30%.

The fraction F3 advantageously comprises between 0 and 50 mol % of anionic monomers A, preferably between 0 and 35 mol %, with respect to the total number of moles of monomers in the fraction F3.

The fraction F3 advantageously comprises between 50 and 100 mol % of nonionic monomers B, preferably between 65 and 100 mol %, with respect to the total number of moles of monomers in the fraction F3.

The fraction F3 advantageously comprises between 0 and 10,000 ppm of compounds I with respect to the total weight of monomers A and B (+optionally monomer C) of the anionic water-soluble polymer, preferably between 10 and 5000 ppm, more preferably between 20 and 1000 ppm.

The fraction F3 advantageously comprises between 0 and 10,000 ppm of compounds II with respect to the total weight of monomers A and B (+optionally monomer C) of the anionic water-soluble polymer, preferably between 0 and 1000 ppm.

The different monomers and compounds constituting F3 are advantageously added in the form of solutions. These solutions can be added separately or in a mixture to the polymer vessel, all at once, in several portions or in the form of a flow, that is to say dropwise. Preferably, the addition occurs in a mixture and in the form of a flow.

The pouring of the fraction F3 advantageously lasts between 10 minutes and 100 minutes, preferably between 30 minutes and 90 minutes.

In a preferred embodiment, the fraction F3 contains at least one monomer B and at least one compound I.

Step f), Polymerization of the Fraction F3 on PG2 in Order to Form the Anionic Water-Soluble Polymer Polymerization (PO3)

The polymerization PO3 occurs as a continuation of the polymerization PO2; it occurs under the same conditions of time and temperature as PO2 (advantageously 70 to 90° C. for 10 minutes to 100 minutes, preferably for between 30 minutes and 90 minutes).

The polymerization PO3 starts with the addition of the first monomers of the fraction F3.

Advantageously, the duration of polymerization PO3 corresponds to the duration of the pouring of the fraction F3.

At the end of the polymerization PO3, the anionic water-soluble polymer is obtained.

In a particular embodiment according to the invention, the anionic water-soluble polymer is allowed to age for between 5 minutes and 60 minutes before the elimination of the residual monomers, preferably for between 10 minutes and 30 minutes.

The reaction is advantageously stopped by addition of an excess of initiator and/or of water; this step is used to eliminate the possible residual monomers present in the solution comprising the anionic water-soluble polymer.

Optional Step(s)

The method according to the invention can moreover comprise additional steps and is not limited to the steps described above.

In a particular embodiment according to the invention, the polymerization method according to the invention can comprise the addition of additional fractions constituting the final anionic water-soluble polymer.

In a preferred embodiment according to the invention, the anionic water-soluble polymer is allowed to age for between 10 minutes and 100 minutes after the step f) of polymerization PO3, preferably for between 30 minutes and 90 minutes. In the case of the addition of additional fractions, the aging occurs after the last polymerization step.

In a particular embodiment according to the invention, a crosslinking agent and/or a transfer agent is/are added during at least one of the steps described above.

In a preferred embodiment according to the invention, a crosslinking agent is added to the fraction F1 and/or to the fraction F2.

When a crosslinking agent is added, it is advantageously selected from the previously mentioned crosslinking agents.

When a crosslinking agent is added, the quantity thereof is advantageously between 5 and 5000 ppm with respect to the total weight of the anionic water-soluble polymer (monomers A, B and optionally C), preferably between 50 and 3000 ppm.

In a preferred embodiment according to the invention, a transfer agent is added to the fraction F1 and/or to the fraction F2.

When a transfer agent is added, it is advantageously selected from the previously mentioned transfer agents.

When a transfer agent is added, the quantity thereof is advantageously between 10 and 10,000 ppm with respect to the total weight of the anionic water-soluble polymer (monomers A, B and optionally C), preferably between 50 and 5000 ppm.

Advantageously, the anionic water-soluble polymer obtained according to the method of the invention is used without post-treatment other than the salification of said polymer. It can be used immediately after the step f) or after one or more optional steps, in solution (without drying or prior purification), or after having been dried.

Paper-Making Method

The present invention also relates to a method for producing paper or cardboard, comprising (1) the addition of an anionic water-soluble polymer according to the invention to an aqueous suspension of fibers (advantageously cellulosic fibers) and (2) the forming of a sheet of paper or cardboard. Thus, the invention relates to the use of an anionic water-soluble polymer in a paper-making method.

The different steps of the method for producing paper, cardboard or the like are known and in accordance with techniques making use of the knowledge of a person skilled in the art; it is not necessary to describe them in more detail, since they are still known and conventional in terms of the knowledge of a person skilled in the art; if necessary, reference can be made to the document: Handbook for Pulp & Paper Technologists, $3^{rd}$ Edition, G. A. Smook.

According to the invention, the anionic water-soluble polymer is added in the paper-making method, before or after forming of the sheet of paper, cardboard or the like. Thus, the contacting of the cellulosic material with the polymer of the invention can be carried out in different ways and notably according to the typical methods known to a person skilled in the art.

The anionic water-soluble polymer can be added to the cellulosic material in the form of a diluted or undiluted aqueous solution. It can be applied by an impregnation technique or it can be added directly to the fibrous suspension at any point of the method for producing paper where dry strength agents are usually introduced.

Thus, the polymer according to the invention can be introduced into the thick pulp ("thick stock" in English) or into the diluted pulp ("thin stock" in English). It can be added at the mixing pump, before the headbox or the filter screen. Preferably, the polymer is introduced before the headbox.

Preferably, the polymer according to the invention is industrially injected into the fibrous suspension, i.e., before its dilution by the pulp water (thick pulp). The consistency of the pulp is on the order of 1 to 5% by weight of cellulosic fibers.

The paper-making method according to the invention can be used with any type of paper pulp such as, for example, virgin fiber pulps (Kraft, Bisulfite), recycled fiber pulps, deinked pulps, mechanical and thermomechanical pulps.

In a preferred embodiment according to the invention, the anionic water-soluble polymer according to the invention is added in combination with a cationic water-soluble polymer in order to reinforce the dry strength properties of the paper while maintaining good drainage performances.

The cationic water-soluble polymers are advantageously selected from PAE (polyaminopolyamide epichlorohydrin), polyvinylamines, glyoxylated polyacrylamides, PEI (polyethyleneimine), PA (polyamines, epichlorohdryin-dimethylamine resins), polymers obtained by the Hofmann degradation, polyacrylamides, starches and the mixtures thereof. Preferably, they are polymers obtained by the Hofmann degradation.

Advantageously, the mass ratio of the anionic water-soluble polymer of the invention to the cationic water-soluble polymer is comprised between 1/10 and 10/1.

The anionic and cationic water-soluble polymers are advantageously added directly to the fibrous suspension before the forming of the sheet.

They can be added separately or in a mixture, in any order of introduction, at a single point or at two points of injection.

The paper-making method according to the invention can also comprise the addition of other additives and/or polymers depending on the needs; as an example and in a nonlimiting manner, one can mention: biocides, coagulants, crosslinking agents, flocculants, starch.

Use

The present invention also relates to the use of the anionic water-soluble polymer in the recovery of hydrocarbons (oil and/or gas); in well drilling or cementing; in the stimulation of hydrocarbon wells (oil and/or gas), for example, hydraulic fracking, conformance, diversion; in the treatment of water in an open, closed or semi-closed circulation; in the treatment of fermentation musts, in the treatment of sludges; in construction; in the treatment of wood; in the treatment of hydraulic compositions (concrete, cement, mortar and aggregates); in the mining industry; in the formulation of cosmetic products; in the battery field; in the formulation of detergents; in textile production; in geothermal technology; in diaper production; or in agriculture.

The present invention also relates to the use of the anionic water-soluble polymer as flocculant, coagulant, binder, fixation agent, viscosity reducing agent, thickening agent, absorbing agent, friction reduction agent, drainage agent, filler retention agent, dehydration agent, conditioning agent, stabilizing agent, fixation agent, film generating agent, sizing agent, superplasticizing agent, clay inhibitor or dispersant.

The invention and the advantages derived therefrom will be more apparent in the following examples given in order to illustrate the invention, and in a non-limiting manner.

Examples

List of the Abbreviations

AMD: Acrylamide (monomer B)
AA: Acrylic acid (monomer A)
DMAM: Dimethylacrylamide (compound II)
SMS: Sodium methallyl sulfonate (compound I)
SPS: Sodium persulfate (polymerization initiator)
ATBS: 2-Acrylamido-2-methylpropanesulfonic acid (monomer A)
IA: Itaconic acid (monomer A)
DMAEMA: Dimethylaminoethyl methacrylate (cationic polymer)

Description of the GPC-Malls Characterization of the Molecular Weight

Gel permeation chromatography is a method that makes it possible to separate macromolecules as a function of their hydrodynamic volume; it is coupled to a Malls detector making it possible to measure the scattering of the light at multiple angles.

The synthesized polymers are analyzed under the following conditions:

Instrument: GPC-2
Columns: Shodex SB-807-HQ & SB-805 custom
Method:
Temperature: 30° C.
Mobile phase: 0.5M $NaNO_3$, HEPES (pH=8), 100 ppm $NaN_3$
Injection: 100 µL
Flow rate: 0.3 mL/min
Detection:
(i) Light scattering detector (MALS): Absolute molar mass
(ii) Refractometry (RI): Concentration The viscosity is measured using a Brookfield viscosimeter, at 25° C. with a Brookfield LV3 module speed 6 rpm.

Preparation of the Polymers 1 to 5 According to the Invention (P1-P5 (INV))

Polymer 1 (P1)

First Sequence: Gradient Polymer or Prepolymer PG1

In a 1-liter reactor equipped with a mechanical stirrer, a thermometer, a condenser, and a gaseous nitrogen immersion rod, one introduces as starter a first fraction F1 consisting of 165.6 g of water, 71.2 g of acrylamide (50% by weight in water), 1 g of citric acid, 0.5 g of dimethylacrylamide, and 0.68 g of sodium methallyl sulfonate. The medium is heated and maintained at a temperature between 79 and 81° C. by means of a water bath. An addition of 0.05 g of sodium persulfate makes it possible to initiate this starter and to initiate the polymerization of the monomers (PO1) in order to form a first gradient polymer PG1.

Second Sequence: Gradient Polymer or Prepolymer PG2

When the exothermic reaction ends, the flow is started: an initiator (30 g of SPS at 0.33% by weight in water) for 130 minutes, and simultaneously a second fraction F2, consisting of 28.8 g of water, 124.9 g of acrylamide (50% by weight in water), 23 g of acrylic acid 100%, 0.5 g of dimethacrylamide, and 0.33 g of sodium methallyl sulfonate, over 50 minutes. After the pouring of the fraction F2, the gradient polymer PG2 is allowed to age for 10 minutes (the polymerization PO2 for forming the gradient polymer PG2 occurs during the pouring of the fraction F2 and during the aging).
Third Sequence: Polymer 1 (P1)

Then, the third fraction F3 consisting of 136.8 g of water, 61.1 g of acrylamide (50% by weight in water), 0.01 g of sodium methallyl sulfonate, is flowed over 60 minutes. At the end of the addition of the fraction F3, the polymer is allowed to age for 10 minutes (the polymerization PO3 for forming the polymer occurs during the pouring of the fraction F3 and during the aging). Once the aging has ended, 165.3 g of water are added as well as 0.15 g of sodium persulfate. When the desired viscosity has been reached, the reaction is stopped by addition of 2.4 g of sodium bisulfite (40% by weight in water) and 165.2 g of water. Another aging of 60 minutes is applied before cooling. The solution comprising polymer 1 (P1) has a pH of 3.5, an active matter of 15% by weight, a viscosity of 8900 cps, and a molecular weight obtained by GPC-Malls of 4,580,000 Da.

Polymers 2-5 According to the Invention (P2 to P5 (INV))

The protocol for preparing the polymer 1 (P1) is reproduced while varying the composition of the different fractions in order to produce the polymers 2 to 5 (P2 to P5); the compositions of the different fractions used to obtain these polymers are summarized in table 1.

Preparation of Counter-Examples Polymers 6 to 11 (CE1 to CE6)

Polymer 6 (CE1)

This polymer is prepared in one sequence.

In a 1-liter reactor equipped with a mechanical stirrer, a thermometer, a condenser, and a gaseous nitrogen immersion rod, one introduces 663.7 g of water, 262.9 g of acrylamide (50% by weight in water), 23.5 g of acrylic acid 100%, 0.5 g of dimethylacrylamide, and 0.65 g of sodium methallyl sulfonate. The pH is adjusted to 6 by addition of 23 g NaOH (50% by weight in water). The reactor is heated to 35° C. The reaction is initiated by the addition of 0.16 g of VA 044.

When the maximum temperature is reached, an aging of 60 minutes is allowed to take place before the addition of 2.4 g of sodium bisulfite (40% by weight in water). Another aging of 60 minutes is applied before cooling. The solution comprising counter-example polymer 6 (CE1) has a pH of 7, an active matter of 15% by weight, a viscosity of 7000 cps, and a molecular weight obtained by GPC-Malls of 1,400,000 Da.

Polymer 7 (CE2)

The polymer 7 is prepared according to the same protocol as for the polymer 6, while varying the monomeric composition of the polymer.

Polymer 8 (CE3)

The polymer 8 is prepared according to the same protocol as for the polymer 1 (that is in 3 sequences), except that the polymer is obtained without compound II (DMAM).

Polymer 9 (CE4)

The polymer 9 (CE4) is prepared according to the same protocol as for the polymer 1 (that is in 3 sequences), except that the polymer is obtained without the compounds I (SMS) and II (DMAM) but in the presence of a transfer agent, sodium hypophosphite (Hypo).

Polymer 10 (CE5)

The polymer 10 (CE5) is prepared according to the same protocol as for the polymer 1 but in 2 sequences only.

Polymer 11 (CE6)

The polymer 11 (CE6) is prepared according to the same protocol as for the polymer 1 (that is in 3 sequences) while varying the monomeric composition of the polymer to obtain an amphoteric polymer.

The compositions of the different fractions of the polymers 1-11 preparation process are summarized in Table 1a.

In Table 1a, the monomer content represents the molar weight percentage of AMD (or AA or ATBS or IA) monomer relative to the total molar weight of the corresponding monomer in the total fractions. Thus the sum of the percentages of AMD monomer, for example, in the three fractions equals 100%.

The contents of compounds I (SMS) and II (DMAM) are expressed in ppm by weight with respect to the total weight of monomer(s) in the three fractions.

TABLE 1a

| Polymer | Amount of the compounds in F1 (by weight) | Amount of the compounds in F2 (by weight) | Amount of the compounds in F3 (by weight) |
|---|---|---|---|
| P1 | AMD: 28%<br>DMAM: 3298 ppm<br>SMS: 4485 ppm | AMD: 48%<br>AA: 100%<br>DMAM: 3298 ppm<br>SMS: 2177 ppm | AMD: 24%<br>SMS: 66 ppm |
| P2 | AMD: 28 %<br>AA: 50%<br>DMAM: 3298 ppm<br>SMS: 4485 ppm | AMD: 48%<br>AA: 50%<br>DMAM: 3298 ppm<br>SMS: 2177 ppm | AMD: 24%<br>SMS: 66 ppm |
| P3 | AMD: 28%<br>DMAM: 3187 ppm<br>SMS: 3569 ppm | AMD: 48%<br>ATBS: 100 %<br>DMAM: 3187 ppm<br>SMS: 1721 ppm | AMD: 24%<br>SMS: 64 ppm |
| P4 | AMD: 28%<br>DMAM: 3306 ppm<br>SMS: 4298 ppm | AMD: 48%<br>IA: 100%<br>DMAM: 3306 ppm<br>SMS: 2050 ppm | AMD: 24%<br>SMS: 66 ppm |
| P5 | AMD: 28%<br>DMAM: 3299 ppm<br>SMS: 3629 ppm | AMD: 48%<br>AA: 100%<br>DMAM: 3299 ppm<br>SMS: 1716 ppm | AMD: 24%<br>SMS: 66 ppm |
| P6 (CE1) | | AMD: 85%<br>AA: 15%<br>DMAM: 3227 ppm<br>SMS: 4195 ppm | |
| P7 (CE2) | | AMD: 70%<br>AA: 30%<br>DMAM: 3333 ppm<br>SMS: 4067 ppm | |
| P8 (CE3) | AMD: 28%<br>SMS: 4578 ppm | AMD: 48%<br>AA: 100%<br>SMS: 2221 ppm | AMD: 24%<br>SMS: 67 ppm |
| P9 (CE4) | AMD: 24%<br>Hypo: 212 ppm | AMD: 48%<br>AA: 100%<br>Hypo: 100 ppm | AMD: 24%<br>Hypo: 3 ppm |
| P10 (CE5) | AMD: 52%<br>DMAM: 3298<br>SMS: 4551 ppm | AMD: 48%<br>AA: 100%<br>DMAM: 3298 ppm<br>SMS: 2177 ppm | |
| P11 (CE6) | AMD: 21.5%<br>DMAEMA: 100%<br>DMAM: 154 ppm<br>SMS: 9667 ppm | AMD: 52%<br>IA: 83%<br>SMS: 7198 ppm | AMD: 26.5%<br>IA: 17%<br>SMS: 1224 ppm |

Table 1a: Compositions of the polymerization process fraction(s) to obtain the polymers P1 to P5 and counter-examples P6 to P11 (CE1 to CE6).

The physicochemical properties of the polymers obtained are described in Table 1b below:

TABLE 1b

| Polymer | Molar ratio of the monomer(s) | Viscosity (cps) | Molecular weight (Da) |
|---|---|---|---|
| P1 | AMD/AA (85/15) | 8900 | 4 580 000 |
| P2 | AMD/AA (85/15) | 7450 | 4 400 000 |
| P3 | AMD/ATBS (85/15) | 6200 | 4 560 000 |
| P4 | AMD/IA (92.5/7.5) | 7800 | 4 300 000 |
| P5 | AMD/AA (85/15) | 7900 | 3 900 000 |
| P6 (CE1) | AMD/AA (85/15) | 7000 | 1 400 000 |
| P7 (CE2) | AMD/AA (70/30) | 8000 | 1 000 000 |
| P8 (CE3) | AMD/AA (85/15) | 8100 | 1 350 000 |
| P9 (CE4) | AMD/AA (85/15) | 8400 | 1 280 000 |
| P10 (CE5) | AMD/AA (85/15) | 8150 | 1 600 000 |
| P11 (CE6) | AMD/DMAEMA/IA (93.6/4.6/1.8) | 7200 | 4 520 000 |

Table 1b: physicochemical properties of polymers P1 to P5 according to the invention and counter-examples CE1 to CE6.

Table 2 summarizes the composition of the different fractions (monomers A and B, compounds I and 11) to prepare polymers Pt to P5 (INV) and CE1 to CE6.

TABLE 2

Composition of the fractions in the synthesis of the polymers 1 to 9.

| | Composition F1 | Composition F2 | Composition F3 |
|---|---|---|---|
| P1 (INV) | B - I - II | A - B - I - II | B - I |
| P2 (INV) | A - B - I - II | A - B - I - II | B - I |
| P3 (INV) | B - I - II | A - B - I - II | B - I |
| P4 (INV) | B - I - II | A - B - I - II | B - I |
| P5 (INV) | B - I - II | A - B - I - II | B - I |
| P6 (CE) | | A - B - I - II | |
| P7 (CE) | | A - B - I - II | |
| P8 (CE) | B - I | A - B - I | B - I |
| P9 (CE) | B | A - B | B |
| P10 (CE) | B - I - II | A - B - I - II | — |
| P11 (CE) | A - B - I - II | A - B - I | A - B - I |

Application Test

The polymers 1 to 11 are used in combination with the following cationic polymers:

HF 31: Polymer of the SNF line, polyvinylamine obtained by the Hofmann degradation, cationic, having a viscosity of 200 cps as well as a dry extract of 21% by weight.

VP 450: Polymer of the SNF line, polyvinylamine obtained by the hydrolysis of polyvinylformamide, cationic, having a viscosity of 1380 cps as well as a dry extract of 19.2% by weight.

The drainage and dry strength performances of the polymers 1 to 11 in combination with HF 31 and VP 450 are evaluated according to the conditions described below.

The wet pulp used in all the application examples is obtained by disintegration of dry pulp in order to obtain a final aqueous concentration of 1% by weight. It is a pulp at neutral pH consisting of 100% recycled cardboard fibers.

Evaluation of the Vacuum Drainage Performances (DDA)

The DDA ("Dynamic Drainage Analyzer") enables one to determine automatically the time (in seconds) necessary to vacuum drain a fibrous suspension on a fabric. The polymers are added to the wet pulp (0.6 liter of pulp at 1.0% by weight) in the cylinder of the DDA under stirring at 1000 rpm:

T=0 s: stirring of the pulp

T=10 s: addition of the polymer(s)

T=30 s: stopping of the stirring and vacuum drainage at 200 mbar for 60 s

The pressure under the fabric is recorded as a function of time. When all the water has been removed from the fibrous mat, the air passes through said mat causing a break in slope of the curve representing the pressure under the fabric as a function of time. The time, expressed in seconds, recorded at this break in slope corresponds to the drainage time. The shorter the time, the better the vacuum drainage is.

Performances in Dry Strength Application, Grammage at 80 $g \cdot m^{-2}$

The necessary quantity of pulp is collected so as to obtain in the end a sheet having a grammage of 80 $g \cdot m^{-2}$.

The wet pulp is introduced into the vat of the dynamic sheet former and maintained under stirring. The different components of the system are injected into this pulp according to the predefined sequence. In general, a contact time of 30 to 45 seconds is complied with between each addition of polymer.

Paper sheet formers are implemented with an automatic dynamic sheet former: a blotting paper and the forming fabric are placed in the drum of the dynamic sheet former before starting the rotation of the drum at 1000 rpm and forming the wall of water. The treated pulp is distributed over the wall of water in order to form the fibrous mat on the forming fabric.

Once the water is drained, the fibrous mat is recovered, pressed under a press delivering 4 bars, and then dried at 117° C. The sheet obtained is conditioned for one night in a room with controlled humidity and temperature (50% relative humidity and 23° C.). The dry strength properties of all the sheets obtained by this procedure are then measured.

The bursting is measured with a Messmer Buchel M 405 bursting tester according to the standard TAPPI T403 om-02.

The dry breaking length is measured in the machine direction using a Testometric AX traction apparatus according to the standard TAPPI T494 om-01.

TABLE 3

Drainage and dry strength results of the composition comprising a cationic polymer HF31 or VP450 with polymers 1 to 5 according to the invention (INV) and with comparative examples polymers 6 to 11 (CE)

| Example | Composition | Percentage of increase Burst (%) | Percentage of increase DBL (%) | Percentage of increase DDA (%) |
|---|---|---|---|---|
| Blank | — | — | — | — |
| Example 1 (INV) | HF 31 + Polymer 1 | 36.4 | 27.0 | 53.3 |
| Example 2 (INV) | HF 31 + Polymer 2 | 34.0 | 26.1 | 55.7 |
| Example 3 (INV) | HF 31 + Polymer 3 | 30.7 | 21.6 | 49.7 |
| Example 4 (INV) | HF 31 + Polymer 4 | 33.6 | 24.5 | 54.8 |

TABLE 3-continued

Drainage and dry strength results of the composition comprising a cationic polymer HF31 or VP450 with polymers 1 to 5 according to the invention (INV) and with comparative examples polymers 6 to 11 (CE)

| Example | Composition | Percentage of increase Burst (%) | Percentage of increase DBL (%) | Percentage of increase DDA (%) |
|---|---|---|---|---|
| Example 5 (INV) | HF 31 + Polymer 5 | 38.4 | 28.0 | 54.3 |
| Example 6 (CE) | HF 31 + Polymer 6 | 22.7 | 11.9 | 30.4 |
| Example 7 (CE) | HF 31 + Polymer 7 | 24.7 | 12.9 | 28.4 |
| Example 8 (CE) | HF 31 + Polymer 8 | 22.5 | 11.8 | 29.8 |
| Example 9 (CE) | HF 31 + Polymer 9 | 22.8 | 12.0 | 30.5 |
| Example 10 (INV) | VP 450 + Polymer 1 | 43.4 | 30.8 | 57.5 |
| Example 11 (INV) | VP 450 + Polymer 2 | 41.7 | 27.7 | 61.1 |
| Example 12 (INV) | VP 450 + Polymer 3 | 40.8 | 24.0 | 58.1 |
| Example 13 (INV) | VP 450 + Polymer 4 | 42.2 | 28.2 | 59.0 |
| Example 14 (INV) | VP 450 + Polymer 5 | 44.7 | 32.9 | 58.1 |
| Example 15 (CE) | VP 450 + Polymer 6 | 28.0 | 13.8 | 43.4 |
| Example 16 (CE) | VP 450 + Polymer 7 | 29.0 | 14.9 | 41.8 |
| Example 17 (CE) | VP 450 + Polymer 8 | 27.1 | 13.2 | 42.4 |
| Example 18 (CE) | VP 450 + Polymer 9 | 28.3 | 13.6 | 44.4 |
| Example 19 (CE) | HF 31 + Polymer 10 | 23.1 | 12.2 | 30.5 |
| Example 20 (CE) | VP 450 + Polymer 10 | 28.5 | 14.1 | 49.4 |
| Example 21 (CE) | HF 31 + Polymer 11 | 21.1 | 13.0 | 39.7 |
| Example 22 (CE) | VP 450 + Polymer 11 | 14.8 | 15.4 | 46.8 |

It is interesting to note that the polymers of the invention (1 to 5), in combination with a cationic polymer, have improved drainage performances (DDA) and mechanical properties (Burst: bursting; DBL: dry breaking) in comparison to a polymer prepared by a conventional method (polymers 6 and 7), in the absence of a structuring system (polymers 8 and 9), in the absence of a third fraction (polymer 10) or in the presence of cationic monomer (polymer 11).

The invention claimed is:

1. An anionic water-soluble polymer comprising:
at least one anionic monomer A;
at least one nonionic monomer B;
at least one structuring system comprising:
(i) at least one compound I, different from the at least one monomer A and selected from: allylsulfonic acid, methallylsulfonic acid, allyldisulfonic acid, methallyldisulfonic acid, salts thereof and mixtures thereof; and
(ii) at least one compound II of formula II, different from the at least one monomer B:

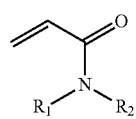

Formula II $R_1$ and $R_2$ being, independently of one another, a hydrogen atom, a methyl group, an ethyl group, an isopropyl group, or a CH2—OH group;
$R_1$ and $R_2$ not both being a hydrogen atom,
said polymer containing no cationic monomer and zwitterionic monomer;
said anionic water-soluble polymer being obtained according to the following steps:
a) formation of a solution (S1) comprising a first fraction (F1) containing (1) at least one monomer selected from the monomers A and B and (2) at least one compound selected from the compounds I and II;
b) polymerization 1 (PO1) of the fraction F1 in order to form a solution of a first gradient polymer (PG1);
c) addition, to the solution comprising PG1, of a second fraction (F2) containing (1) at least one monomer selected from the monomers A and B and (2) at least one compound selected from the compounds I and II;
d) polymerization 2 (PO2) of the fraction F2 on PG1 in order to form a solution of a second gradient polymer (PG2);
e) addition, to the solution comprising PG2, of a third fraction (F3) containing (1) at least one monomer selected from the monomers A and B and (2) at least one compound selected from the compounds I and II;
f) polymerization 3 (PO3) of the fraction F3 on PG2 in order to form a solution comprising an anionic water-soluble polymer, and at least one of the fractions F1, F2 or F3 contains at least one monomer A, at least one of the fractions F1, F2 or F3 contains at least one monomer B, at least one of the fractions F1, F2 or F3 contains at least one compound I and at least one of the fractions F1, F2 or F3 contains at least one compound II and the anionic water-soluble polymer does not comprise a crosslinking agent.

2. The anionic water-soluble polymer according to claim 1, characterized in that the at least one anionic monomer A is selected from acrylic acid, methacrylic acid, itaconic acid, crotonic acid, maleic acid, fumaric acid, acrylamidoundecanoic acid, 3-acrylamido-3-methylbutanoic acid, maleic anhydride, 2-acrylamido-2-methylpropanesulfonic acid (ATBS), vinylsulfonic acid, vinylphosphonic acid, 2-sulfoethylmethacrylate, sulfopropylmethacrylate, sulfopropylacrylate, allylphosphonic acid, styrenesulfonic acid, 2-acrylamido-2-methylpropanedisulfonic acid, salts thereof and mixtures thereof.

3. The anionic water-soluble polymer according to claim 1, characterized in that the at least one nonionic monomer B is selected from acrylamide, methacrylamide, N-vinylformamide (NVF), N-vinyl acetamide, N-vinylpyrrolidone (NVP), N-vinyl imidazole, N-vinyl succinimide, acryloyl morpholine (ACMO), acryloyl chloride, glycidyl methacrylate, glyceryl methacrylate, diacetone acrylamide, hydroxyalkyl (meth)acrylate, thioalkyl (meth)acrylate and mixtures thereof; the alkyls being $C_1$-$C_3$.

4. The anionic water-soluble polymer according to claim 1, characterized in that it comprises between 500 and 50,000 ppm of compound I with respect to the total weight of the monomers A and B.

5. The anionic water-soluble polymer according to claim 1, characterized in that it comprises between 500 and 50,000 ppm of compound II with respect to the total weight of the monomers A and B.

6. The anionic water-soluble polymer according to claim 1, characterized in that the compound II is selected from: N,N-dimethacrylamide, N,N-diethylacrylamide, N,N-isopropylacrylamide, N-methylolacrylamide and mixtures thereof.

7. The anionic water-soluble polymer according to claim 1, characterized in that the mass ratio of compound I to compound II is between 0.01 and 100.

8. A method for making an anionic water-soluble polymer comprising:
at least one anionic monomer A;
at least one nonionic monomer B;
at least one structuring system comprising:
(i) at least one compound I, different from the at least one monomer A and selected from:
allylsulfonic acid, methallylsulfonic acid, allyldisulfonic acid, methallyldisulfonic acid, salts thereof and mixtures thereof; and
(ii) at least one compound II of formula II, different from the at least one monomer B:

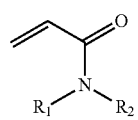

Formula II $R_1$ and $R_2$ being, independently of one another, a hydrogen atom, a methyl group, an ethyl group, an isopropyl group or a $CH_2$—OH group;
$R_1$ and $R_2$ not both being a hydrogen atom ($R_1 \neq H$ when $R_2$=H; $R_2 \neq H$ when $R_1$=H);
said polymer containing no cationic monomer and zwitterionic monomer;
the method comprising the following steps:
a) formation of a solution (S1) comprising at least a first fraction (F1) containing (1) at least one monomer selected from the monomers A and B and (2) at least one compound selected from the compounds I and II;
b) polymerization 1 (PO1) of the fraction F1 in order to form a solution of a first gradient polymer (PG1);
c) addition, to the solution comprising PG1, of a second fraction (F2) containing (1) at least one monomer selected from the monomers A and B and (2) at least one compound selected from the compounds I and II;
d) polymerization (PO2) of the fraction F2 on PG1 in order to form a solution of a second gradient polymer (PG2);
e) addition, to the solution comprising PG2, of a third fraction (F3) containing (1) at least one monomer selected from the monomers A and B and (2) at least one compound selected from the compounds I and II;
f) polymerization (PO3) of the fraction F3 on PG2 in order to form a solution comprising an anionic water-soluble polymer, and at least one of the fractions F1, F2 or F3 contains at least one monomer A, at least one of the fractions F1, F2 or F3 contains at least one monomer B, at least one of the fractions F1, F2 or F3 contains at least one compound I and at least one of the fractions F1, F2 or F3 contains at least one compound II, and
the anionic water-soluble polymer does not comprise a crosslinking agent.

9. The method according to claim 8, characterized in that an initiator is added continuously throughout the entire method.

10. The method according to claim 8, characterized in that, after step f) of polymerization (PO3), the method comprises an aging step of 10 minutes to 100 minutes.

11. A method for producing paper cardboard, comprising the addition of an anionic water-soluble polymer according to claim 1, to an aqueous suspension of fibers, and the forming of a sheet of paper or cardboard.

12. A method for recovery of hydrocarbons; well drilling or cementing; stimulation of hydrocarbon wells; treatment of water in an open, closed or semi-closed circulation; treatment of fermentation musts, treatment of sludges; construction; treatment of wood; treatment of hydraulic compositions; mining industry; formulation of cosmetic products; the battery field; formulation of detergents; textile production; geothermal technology; diaper production; or agriculture, comprising preparing an aqueous preparation comprising the anionic water-soluble polymer according to claim 1, and using said preparation in the method.

13. A flocculant, coagulant, binder, fixation agent, viscosity reducing agent, thickening agent, absorbing agent, friction reduction agent, drainage agent, filler retention agent, dehydration agent, conditioning agent, stabilizing agent, fixation agent, film generating agent, sizing agent, superplasticizing agent, clay inhibitor or dispersant, comprising the anionic water-soluble polymer according to claim 1.

14. The anionic water-soluble polymer according to claim 2, characterized in that the at least one nonionic monomer B is selected from acrylamide, methacrylamide, N-vinylformamide (NVF), N-vinyl acetamide, N-vinylpyrrolidone (NVP), N-vinyl imidazole, N-vinyl succinimide, acryloyl morpholine (ACMO), acryloyl chloride, glycidyl methacrylate, glyceryl methacrylate, diacetone acrylamide, hydroxyalkyl (meth)acrylate, thioalkyl (meth)acrylate and mixtures thereof; the alkyls being $C_1$-$C_3$.

15. The anionic water-soluble polymer according to claim 2, characterized in that it comprises between 500 and 50,000 ppm of compound I with respect to the total weight of the monomers A and B.

16. The anionic water-soluble polymer according to claim 2, characterized in that it comprises between 500 and 50,000 ppm of compound II with respect to the total weight of the monomers A and B.

17. The anionic water-soluble polymer according to claim 2, characterized in that the compound II is selected from: N,N-dimethacrylamide, N,N-diethylacrylamide, N,N-isopropylacrylamide, N-methylolacrylamide and mixtures thereof.

18. The anionic water-soluble polymer according to claim 2, characterized in that the mass ratio of compound I to compound II is between 0.01 and 100.

19. The anionic water-soluble polymer according to claim 14, characterized in that it comprises:
between 500 and 50,000 ppm of compound I with respect to the total weight of the monomers A and B; and
between 500 and 50,000 ppm of compound II with respect to the total weight of the monomers A and B.

20. The anionic water-soluble polymer according to claim 19, characterized in that
the compound II is selected from: N,N-dimethacrylamide, N,N-diethylacrylamide, N,N-isopropylacrylamide, N-methylolacrylamide and mixtures thereof; and
the mass ratio of compound I to compound II is between 0.01 and 100.

* * * * *